(12) United States Patent
Takeuchi (10) Patent No.: US 8,687,106 B2
(45) Date of Patent: Apr. 1, 2014

(54) CAMERA DEVICE, MOBILE TERMINAL AND FRAME RATE CONTROLLING METHOD

(75) Inventor: Minoru Takeuchi, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/332,171

(22) Filed: Dec. 20, 2011

(65) Prior Publication Data

US 2012/0162462 A1   Jun. 28, 2012

(30) Foreign Application Priority Data

Dec. 24, 2010 (JP) ................................. 2010-287692

(51) Int. Cl.
*G03B 13/00* (2006.01)
*G03B 7/00* (2006.01)
*H04N 5/235* (2006.01)

(52) U.S. Cl.
USPC .......... 348/345; 348/229.1; 348/349; 348/362

(58) Field of Classification Search
USPC ...................................... 348/229.1, 345–356
See application file for complete search history.

(56) References Cited

U.S. PATENT DOCUMENTS

| 6,972,799 B1 * | 12/2005 | Hashimoto | 348/350 |
| 2010/0128143 A1 * | 5/2010 | Ohtsubo | 348/229.1 |
| 2010/0171844 A1 * | 7/2010 | Okamoto et al. | 348/229.1 |
| 2010/0177236 A1 * | 7/2010 | Suzuki et al. | 348/349 |

FOREIGN PATENT DOCUMENTS

JP    2008-145760 A    6/2008

* cited by examiner

*Primary Examiner* — Michael Osinski
*Assistant Examiner* — Quan Pham
(74) *Attorney, Agent, or Firm* — Procopio, Cory, Hargreaves & Savitch LLP (57) ABSTRACT

A mobile phone apparatus 10 is equipped with a camera module 36 including an image sensor (52), an AE evaluation circuit (60), etc. When a camera function is executed, an exposure is adjusted such that an exposure evaluated value is equal to an exposure target value, whereby, an AF controlling processing is executed. For example, when a shutter key is operated, the exposure target value is changed to an exposure target value for AF control being smaller than an exposure target value for normal photographing. Furthermore, a frame rate is increased such that the exposure evaluated value having a correlation to the frame rate is smaller than the exposure target value in response to the change of the exposure target value. Then, the AF controlling processing is executed on the basis of the image data every frame output from the image sensor (52) at the increased frame rate.

10 Claims, 6 Drawing Sheets

CAMERA DEVICE, MOBILE TERMINAL AND FRAME RATE CONTROLLING METHOD

CROSS REFERENCE OF RELATED APPLICATION

The disclosure of Japanese Patent Application No. 2010-287692 is incorporated herein by reference.

BACKGROUND OF THE INVENTION

1. Field of the Invention

The present invention relates to a camera device, a mobile terminal and a frame rate controlling method. Specifically, the present invention relates to a camera device, mobile terminal and frame rate controlling method that brings an image into focus by auto focusing (AF).

2. Description of the Related Art

Conventionally, mobile terminals equipped with camera device which bring an image into focus by autofocusing have been widely known. One example of apparatuses of such a kind is disclosed in Japanese Patent Application Laying-Open No. 2008-145760 [G02B 7/28, G03B 13/36, G02B 7/36, H04N 5/232] laid-open on Dec. 11, 2006. An automatic focusing system of the related art has an image pickup device for imaging and an image pickup device for AF (autofocusing) onto each of which the same image is irradiated. Thus, in a focus control, a set of focus lenses is adjusted on the basis of video signals acquired from the image pickup device for AF. Furthermore, in the focusing system, an electronic shutter speed and a frame rate are increased in speed to the extent that shortage of the light amount occurs, which improves follow-up characteristics in focusing.

However, in the automatic focusing system of the related art, the two image pickup devices are operated for focus control, thus, an area of a circuit to which the automatic focusing system is employed is made large, making the power consumption high. Thus, the automatic focusing system of the related art is never used in mobile terminals, such as mobile phone apparatuses for which their small size and low power consumption are challenges.

SUMMARY OF THE INVENTION

Therefore, it is a primary object of the present invention to provide a novel camera device, mobile terminal and frame rate controlling method.

Another object of the present invention is to provide a camera device, a mobile terminal and a frame rate controlling method capable of improving usability in photographing.

The present invention employs following features in order to solve the above-described problem. It should be noted that reference numerals and the supplements inside the parentheses show one example of a corresponding relationship with the embodiments described later for easy understanding of the present invention, and do not limit the present invention.

A first aspect in accordance with the present invention is a camera device having an image sensor for outputting image data and an outputter for adjusting exposure of the image data output from the image sensor and outputting an evaluated value for exposure at that time, the camera device controlling a frame rate of the image data output from the image sensor and performing an AF controlling processing based on the image data every frame output from the image sensor, comprising: a changer which changes from a first target value for normal photographing to a second target value for AF control being smaller than the first target value when a photographing operation is made; and an increase controller which increases the frame rate such that the evaluated value output by the outputter is equal to or more than the second target value to which the change is made by the changer, wherein the AF controlling processing is performed on the basis of the image data output at the frame rate increased by the increase controller.

In the first aspect in accordance with the present invention, an image sensor (52) of a camera device (10: reference numeral illustrating a corresponding part in this embodiment. This holds true hereunder.) outputs image data corresponding to an image of an object scene. An outputter (60) adjusts an exposure by controlling a frame rate at which the image data is output and outputs an evaluated value of an exposure at this time. Also, the frame rate at which the image data is output is controlled. After the exposure is adjusted, an AF controlling processing on the basis of the image data output from the image sensor every frame is performed. A changer (24, S3) changes from a target value for normal photographing to a target value for AF control when a photographing operation of pushing a shutter key is made, for example. Also, when the target value is changed, an increase controller (24, S7) increases the frame rate of the image sensor such that the evaluated value is equal to or more than the second target value. Then, when the frame rate is increased, the AF controlling processing is performed on the basis of the image data output at the increased frame rate every frame.

According to the first aspect in accordance with the present invention, an exposure time every frame is shortened by increase of the frame rate, and whereby, it is possible to shorten a processing time for the AF controlling processing. Moreover, the time for the AF controlling processing is shortened, capable of improving usability in photographing.

A second aspect in accordance with the present invention further comprises a decrease controller which decreases the frame rate when in accordance with the increase of the frame rate by the increase controller, the evaluated value output by the outputter is smaller than the second target value.

In the second aspect of the present invention, a decrease controller (24, S11) decrease the frame rate such that the evaluated value is slightly more than the second target value in a case that in accordance with the increase of the frame rate, the evaluated value is smaller than the second target value.

According to the second aspect of the present invention, it is possible to increase the frame rate to the utmost limit to the extent that the evaluated value is not smaller than the target value.

A third aspect of the present invention further comprises: a gain controller which controls a gain of an output from the image sensor; a determiner which determines whether or not the gain of the output from the image sensor is maximum when in accordance with the increase of the frame rate by the increase controller, the evaluated value output by the outputter is smaller than the second target value; and a gain heightener which heightens the gain of the output from the image sensor when the determiner determines that the gain of the output from the image sensor is not maximum.

In the third aspect of the present invention, the gain controller (62) controls a gain of the circuit including the AGC connected to the image sensor, for example. A determiner (24, S21) determines whether or not the gain is maximum when the evaluated value is smaller than the second target value in accordance with the increase of the frame rate. A gain heightener (24, S23) heightens the gain when the output from the image sensor is not maximum. Also, when the gain is heightened, the luminance of the image output from the image sensor is also heightened.

According to the third aspect of the present invention, before the frame rate takes the maximum value, even if the evaluated value is smaller than the target value, the gain is heightened to thereby increase the evaluated value, resulting in a further increase of the frame rate.

A fourth aspect of the present invention further comprises a decrease controller which decreases the frame rate when the determiner determines that the gain of the output from the image sensor is maximum.

In the fourth aspect of the present invention, a decrease controller (24, S11) decreases the frame rate when it is determined that the gain of the output from the image sensor is maximum while the evaluated value is smaller than the second target value.

According to the fourth aspect of the present invention, at a time when the evaluated value is smaller than the target value, if the gain is the maximum value, the frame rate is decreased. That is, similar to the second invention, it is possible to increase the frame rate to the utmost limit to the extent that the evaluated value is not smaller than the target value.

A fifth aspect of the present invention further comprises an initializer which returns the second target value to the first target value after the AF controlling processing is executed.

In the fifth aspect of the present invention, an initializer (24, S15) returns the second target value to the first target value after the AF controlling processing is executed.

According to the fifth aspect of the present invention, after completion of the AF controlling processing, the target value is returned to the target value for normal photographing, and therefore, it is possible to store an image for which brightness is normally corrected in photographing processing.

A sixth aspect of the present invention is a mobile terminal equipped with a camera device according to any one of the first to fifth invention.

According to the sixth aspect of the present invention, even in the mobile terminal having a camera function, the time taken for the AF controlling processing is shortened similar to the first invention, and therefore, it is possible to improve usability in photographing.

A seventh aspect of the present invention is a frame rate controlling method of a camera device (10) having an image sensor (52) for outputting image data and an outputter (60) for adjusting an exposure of the image data output from the image sensor and outputting an evaluated value for this exposure, the camera device controlling a frame rate of the image data output from the image sensor and performing an AF controlling processing based on the image data every frame output from the image sensor, comprising: changing (S3) from a first target value for normal photographing to a second target value for AF control being smaller than the first target value when a photographing operation is made, and increasing (S7) the frame rate such that the evaluated value output by the outputter is equal to or more than the second target value, wherein the AF controlling processing is performed on the basis of the image data output at the frame rate increased by the increase controller.

In the seventh aspect of the present invention as well, the time taken for the AF controlling processing is shortened, and therefore, it is possible to improve usability in photographing.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
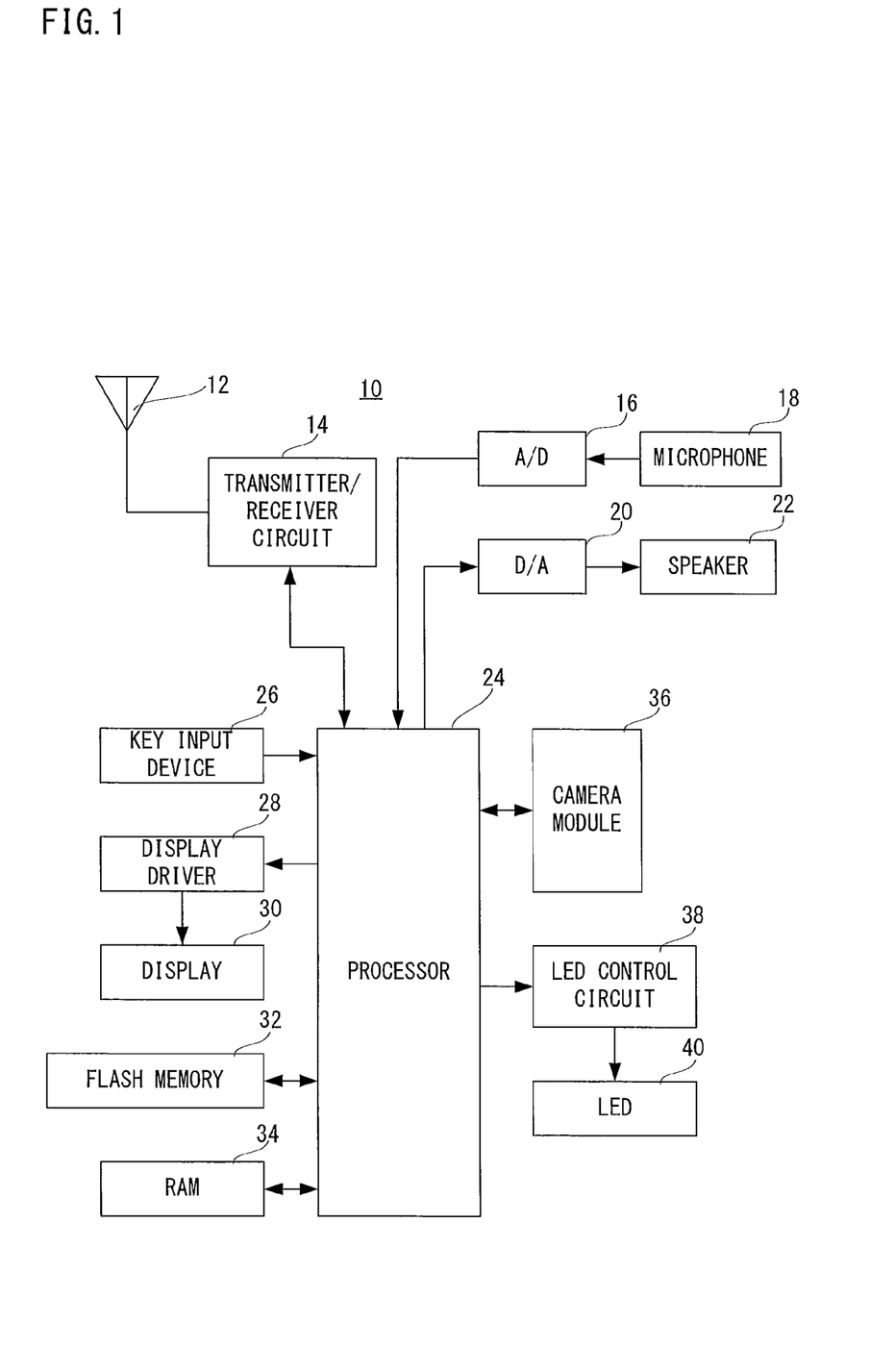
FIG. 1 is an illustrative view showing an electric configuration of a mobile phone apparatus of one embodiment of the present invention.

Referring to FIG. 1, a mobile phone apparatus 10 of this embodiment is one kind of mobile terminals, and includes a processor 24 which is called a computer or a CPU. Furthermore, the processor 24 is connected with a transmitter/receiver circuit 14, an A/D converter 16, a D/A converter 20, a key input device 26, a display driver 28, a flash memory 32, a RAM 34, a camera module 36 and an LED control circuit 38. The transmitter/receiver circuit 14 is connected with an antenna 12, the A/D converter 16 is connected with a microphone 18, and the D/A converter 20 is connected with a speaker 22. Furthermore, the display driver 28 is connected with a display 30. In addition, the LED control circuit 38 is connected with an LED 40. Also, the mobile phone apparatus 10 is equipped with a camera module 36, and thus may be called a camera device.

The processor 24 entirely controls the mobile phone apparatus 10. The RAM 34 is utilized as a work area (including depiction area) or a buffer area of the processor 24. In the flash memory 32, content data of characters, images, voices, sounds, and video images for the mobile phone apparatus 10 are recorded.

The A/D converter 16 converts an analog voice signal relative to a voice or a sound input through the microphone 18 connected to the A/D converter 16 into a digital voice signal. The D/A converter 20 converts (decodes) a digital voice signal into an analog voice signal, and applies the converted signal to the speaker 22 via an amplifier not shown. Accordingly, a voice or a sound corresponding to the analog voice signal is output from the speaker 22. Here, the processor 24 controls an amplification factor of the amplifier to thereby adjust the volume of the voice output from the speaker 22.

The key input device 26 is called an operator, and is provided with a shutter key for photographing, a cursor key, an off-hook key and an on-hook key. Then, key information (key data) operated by a user is input to the processor 24. Also, when any key included in the key input device 26 is operated, a clicking sound is produced. Accordingly, the user can gain an operational feeling with respect to the key operation by listening to the clicking sound.

The display driver 28 controls display of the display 30 connected to the display driver 28 under the instruction of the processor 24. Also, the display driver 28 includes a video memory (not illustrated) for temporarily storing the image data to be displayed.

The camera module 36 is constituted of components and circuitry necessary for executing a camera function. It should be noted that the camera module 36 will be described in detail by using FIG. 2, and therefore, a description is omitted here.

The LED control circuit 38 controls light-emission of the LED 40 connected thereto under the instruction of the processor 24. Furthermore, in a case that the camera function is executed, the LED 40 may emit light as a flash. Here, the LED control circuit 38 and the LED 40 may be called a light-emitter.

The transmitter/receiver circuit 14 is a circuit for making wireless communications according to a CDMA system. For example, when an outgoing call is instructed by the user using the input device 26, the transmitter/receiver circuit 14 executes outgoing call processing under the instruction of the processor 24 and outputs a outgoing call signal via the antenna 12. The outgoing call signal is sent to a phone of a communication partner through base stations and communication networks (not illustrated). Then, when incoming call processing is performed by the phone of the communication partner, a communication allowable state is established, and the processor 24 executes speech communication processing.

Normal speech communication processing is explained in detail. A modulated voice signal transmitted from the phone of the communication partner is received by the antenna 12. The received modulated audio signal is subjected to demodulation processing and decode processing by the transmitter/receiver circuit 14. Then, the received voice signal acquired through such processing is converted into an analog voice signal by the D/A converter 20, and then output from the speaker 22. On the other hand, a voice signal to be transmitted that is captured through the microphone 18 is converted into a digital voice signal by the A/D converter 16, and then applied to the processor 24. The voice signal to be transmitted which has been converted into a digital voice signal is subjected to encoding processing and modulation processing by the transmitter/receiver circuit 14 under the control of the processor 24 and output via the antenna 12. Thus, the modulated audio signal is sent to the phone of the communication partner via base stations and communication networks.

Furthermore, when an outgoing call signal from the communication partner is received by the antenna 12, the transmitter/receiver circuit 14 notifies an incoming call to the processor 24. In response thereto, the processor 24 controls the display driver 28 to display calling source information (phone number, etc.) described in the incoming call notification on the display 30. Furthermore, at almost the same time, the processor 24 outputs a ringing tone (ringing melody, ringing voice) from a speaker not shown.

Then, when the user performs an answer operation using the off-hook key, the transmitter/receiver circuit 14 executes incoming call processing under the instruction of the processor 24. Then, when a communication allowable state is established, the processor 24 executes the above-described normal speech communication processing.

Furthermore, when a speech communication end operation is performed by the on-hook key after a shift to the speech communication allowable state, the processor 24 sends a speech communication end signal to the communication partner by controlling the transmitter/receiver circuit 14. After sending the speech communication end signal, the processor 24 ends the speech communication processing. Furthermore, in a case that a speech communication end signal from the communication partner is received as well, the processor 24 ends the speech communication processing. In addition, in a case that a speech communication end signal from the mobile communication network is received independent of the communication partner, the processor 24 ends the speech communication processing.

Figure 2:
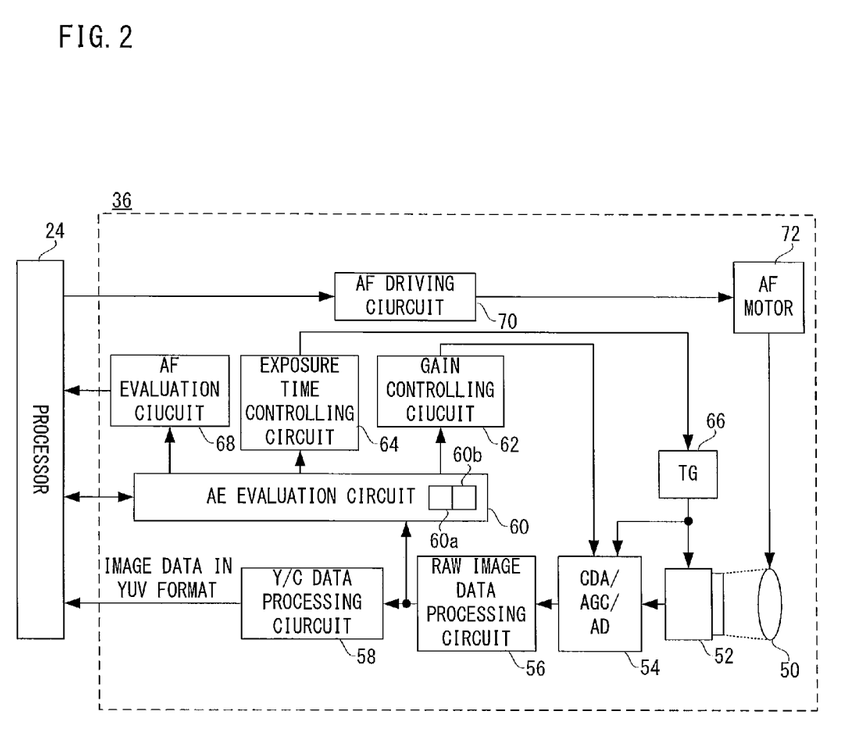
FIG. 2 is an illustrative view showing an electric configuration of a camera module shown in FIG. 1.

With reference to FIG. 2, the camera module 36 is called an imager, and includes a focus lens 50, an image sensor 52, a CDS/AGC/AD circuit 54, a raw image data processing circuit 56, a Y/C data processing circuit 58, an AE evaluation circuit 60, a gain controlling circuit 62, an exposure time controlling circuit 64, a TG 66, an AF evaluating circuit 68, an AF driving circuit 70 and an AF motor 72.

An optical image of an object is irradiated onto an imaging surface of the image sensor 52 through the focus lens 50. On the imaging surface of the image sensor 52, charge-coupled devices corresponding to SXGA (1280×1024 pixels) are arranged. Furthermore, on the imaging surface, a raw image signal corresponding to the optical image of the object is generated by photoelectronic conversion.

For example, when an operation of executing a camera function is performed by the user, the processor 24 instructs the TG 66 to repetitively perform a pre-exposure and thinning-out reading via the AE evaluation circuit 60 and the exposure time controlling circuit 64 in order to execute through image processing. The TG 66 applies a plurality of timing signals to the image sensor 52 and the CDS/AGC/AD circuit 54 in order to execute pre-exposure of the imaging surface of the image sensor 52 and thinning-out reading of the electric charges obtained through the pre-exposure. The raw image signal generated in the imaging surface is read in response to a vertical synchronization signal Vsync generated every $1/30$ to $1/15$ sec. in an order according to a raster scanning.

Furthermore, the CDS/AGC/AD circuit 54, which is in synchronism with the image sensor 52 by a timing signal, performs a series of processing, such as correlative double sampling, automatic gain adjustment and A/D conversion on the raw image signal output from the image sensor 52. Also, the CDS/AGC/AD circuit 54 outputs the raw image data on which such processing is performed to the raw image data processing circuit 56. The raw image data processing circuit 56 performs white balance adjustment, etc. on the raw image data and outputs the resultant signal to the Y/C data processing circuit 58 and the AE evaluation circuit 60.

The Y/C data processing circuit 58 performs processing such as color separation, YUV conversion, etc. on the input image data to thereby output image data in the YUV format to the processor 24. The processor 24 temporarily stores the image data in the YUV format in the RAM 34. The image data in the YUV format is converted into image data in the RGB format. Then, the processor 24 applies the image data in the RGB format to the display driver 28 to thereby output the image data in the RGB format to the display 30. Thus, a low-resolution through-image representing an object is displayed on the display 30.

On the other hand, in the AE evaluation circuit 60 called an outputter, an exposure evaluated value representing brightness of the object scene is created on the basis of the input image data. Here, the exposure evaluated value is an average value of the luminance of an AE evaluation area set to the image to be captured by the image sensor 52.

The created exposure evaluated value is output to the processor 24, and the processor 24 applies an AE controlling processing executing instruction to the AE evaluation circuit 60 in response to an input of the exposure evaluated value. The AE evaluation circuit 60 which has received the AE controlling processing executing instruction controls the gain controlling circuit 62 and the exposure time controlling circuit 64 such that the exposure evaluated value is equal to the exposure target value for normal photographing (first exposure target value) stored in the first register 60a.

First, the AE evaluation circuit 60 controls the exposure time controlling circuit 64 to thereby change the frame rate and make an adjustment to an adequate exposure time. Here, as the frame rate increases, the exposure time is short, and thus, the luminance of the image is low. Furthermore, as the frame rate decreases, the exposure time is long, and thus, the luminance of the image is high.

For example, in a bright environment such as outdoors, the frame rate is set to 30 fps through 15 fps while in a low-light environment, the frame rate is set to in the order of 10 fps through 3 fps. That is, in the low-light environment where the exposure evaluated value is small, the frame rate is decreased in order to make an exposure time for each frame long to thereby make the image bright. Thus, it becomes possible to capture a bright image by the image sensor 52 even in the low-light environment.

Next, the AE evaluation circuit 60 controls the gain controlling circuit 62, which is also called a gain controller, to thereby adjust a gain of the CDS/AGC/AD circuit 54 to an appropriate value. For example, when the gain becomes high, the raw image signal is amplified to thereby make the luminance of the image high. Alternatively, when the gain becomes low, the raw image signal is not amplified to thereby make the luminance of the image low.

Here, the processor 24 may cause the LED 40 to emit light to thereby make the luminance of the image high on the basis of an exposure evaluated value and a user's operation.

Furthermore, after the AE evaluation circuit 60 adjusts the image to proper brightness, it outputs the image data to the AF evaluating circuit 68. The AF evaluating circuit 68 outputs an AF evaluated value indicating focus measuring of the object scene on the basis of the image data. The processor 24 applies an instruction of changing the position of the focus lens 50 to the AF driving circuit 70 on the basis of the AF evaluated value. The AF driving circuit 70 drives the AF motor 72 on the basis of the instruction applied from the processor 24 to thereby change the lens position of the focus lens 50.

For example, when the shutter key is operated by the user, the processor 24 issues an instruction to the AE evaluation circuit 60 to thereby adjust the image to proper brightness, and then executes the AF controlling processing. When the AF controlling processing is executed, the processor 24 moves the focus lens 50 while recording the AF evaluated value every frame. Furthermore, the processor 24 searches a peak (maximum value) of the AF evaluated values by a so-called hill-climbing search, moves the focus lens 50 to a lens position where the AF evaluated value takes a peak, and then executes main photographing processing. This makes it possible to store the image data for which the object is into focus.

Furthermore, when the main photographing processing is executed, signal processing is performed on a raw image signal output from the image sensor 52, and resultant image data through the processing is temporarily stored in the RAM 34. In addition, recording processing is performed on the flash memory 32. Specifically, the processor 24 reads the image data from the RAM 34, brings meta-information in the Exif format into association with the read image data, and records them in the flash memory 32 as one file. In addition, the processor 24 outputs a sound for notifying that the main photographing processing is being executed from a speaker not shown.

Here, in a case that a memory card is connected to the mobile phone apparatus 10, image data may be stored in the memory card.

For example, when the frame rate is 15 fps, and the focus lens 50 is adjustable in 25 levels, in a case that the peak value of the AF evaluated value is in the 25-th level, a processing time of the AF controlling processing is about 1.7 sec. On the contrary thereto, in a case that the frame rate decrease to 3 fps due to the low-light environment, the processing time of the AF controlling processing becomes about 8.3 sec. At this time, it is conceivable that in the low-light environment, during the AF controlling processing as well, the LED 40 is made to emit light as flash, but it is difficult to make the LED 40 emit light at the maximum output for a long time, and thus, the LED 40 during the AF control emits light in brightness to the extent that it emits light for a long time. In this case, the enough amount of light cannot be obtained, so that the exposure time becomes not so short. As a result, the processing time of the AF controlling processing is made longer, resulting in the high power consumption for making the LED 40 emit light.

However, with an image during an AF control, there is less need or less notice for brightness than when a composition is decided before photographing or when photographing is performed. Thus, it is believed that even if a through-image displayed during the AF control is appreciably dark, the user scarcely takes care of it.

Hereupon, in this embodiment, only when the AF controlling processing is being executed, the frame rate is increased (the brightness is reduced) to the minimum brightness required to determine the peak by the AF evaluated value, and whereby the processing time of the AF controlling processing is shortened to thereby shorten the time required for photographing.

First, during execution of the AF controlling processing, an exposure target value for AF control (second exposure target value) being lower than an exposure target value for normal photographing is set. To explain this in detail, the exposure target value for AF control is stored in a second register 60b of the AE evaluation circuit 60. Thus, when an operation of the shutter key is notified, the AE evaluation circuit 60 switches the register from which the exposure target value is read from the first register 60a to the second register 60b. Then, the frame rate is increased such that the exposure evaluated value is equal to or more than the exposure target value for AF control stored in the second register 60b. Furthermore, when the frame rate is increased, the processor 24 applies an instruction of returning the exposure target value to the original setting to the AE evaluation circuit 60 after execution of the AF controlling processing. In addition, the processor 24 executes the main photographing processing to thereby store the image data.

Figure 3:
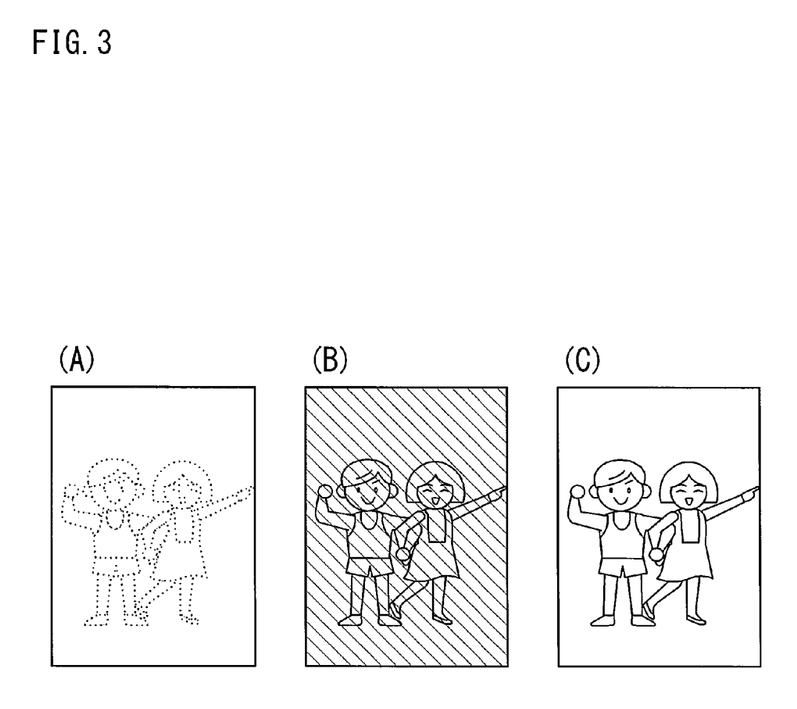
FIG. 3 is an illustrative view showing changes in brightness of the image to be displayed on a display shown in FIG. 1.

As described above, in a case that the frame rate is changed, display on the display 30 is changed from FIG. 3(A) to FIG. 3(C). First, with reference to FIG. 3(A), before the shutter key is operated, the object scene image being out of focus is displayed. Next, with reference to FIG. 3(B), when the shutter key is operated, the displayed image becomes dark, and the image being in focus is displayed by the AF controlling processing. Then, with reference to FIG. 3(C), when the AF controlling processing is ended, the exposure target value is returned to the original setting, so that the image displayed on the display 30 is also returned to the original brightness. At this time, image data corresponding to the displayed image is stored in the flash memory 32. Thus, after completion of the AF controlling processing, the exposure target value is returned to that for normal photographing, and thus, in the main photographing processing, an image on which brightness is normally corrected can be stored.

Then, in a case that the frame rate is increased from 3 fps to 10 fps, the processing time of the AF controlling processing is shortened to one-third, that is, about 2.5 sec. Thus, the time required for photographing is shortened, capable of improving usability of the user during photographing. Also, in a case that the LED 40 is made to emit light as a flash, the light-emission time is as little as one-third, capable of reducing the power consumption.

In addition, in this embodiment, in a case that the exposure evaluated value is smaller than the exposure target value for AF control as a result of increase of the frame rate, the frame rate is decreased by one level. That is, by decreasing the frame rate by one level, the exposure evaluated value can be returned to be larger than the exposure target value for AF control. Then, by performing the control in this way, the frame rate can be increased to the utmost limit to the extent that the exposure evaluated value is not smaller than the exposure target value. Here, when the frame rate is 15 fps, if the frame rate is decreased by one level, the frame rate becomes 14 fps.

In addition, before the exposure evaluated value is equal to or more than the exposure target value for AF control, if the frame rate reaches the maximum value, the exposure time cannot be shortened any more. Thus, even if the exposure evaluated value does not reach the exposure target value for AF control, the AF controlling processing is executed.

Figure 4:
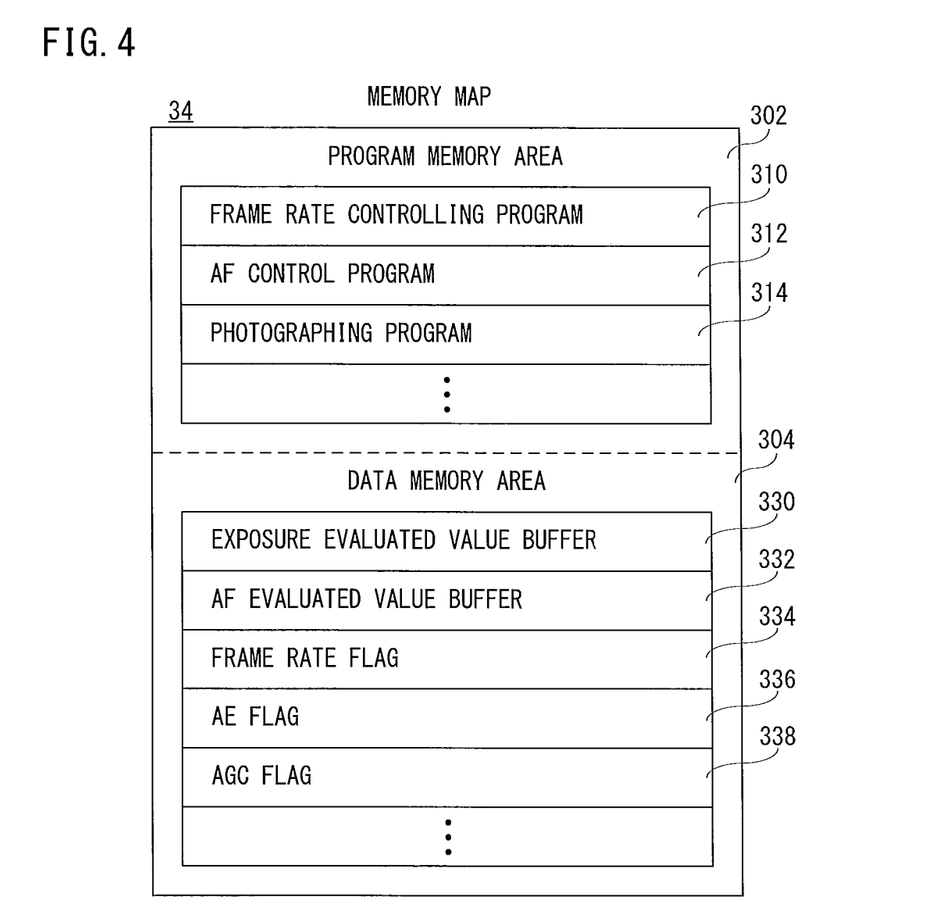
FIG. 4 is an illustrative view showing one example of a memory map of a RAM shown in FIG. 1.

FIG. 4 is an illustrative view showing a memory map of the RAM 34. In the memory map of the RAM 34, a program memory area 302 and a data memory area 304 are included. A part of programs and data are read entirely at a time, or partially and sequentially as necessary from the flash memory 28, stored in the RAM 34, and then executed by the processor 24, etc.

In the program memory area 302, a program for operating the mobile phone apparatus 10 is stored. The program for operating the mobile phone apparatus 10 is made up of a frame rate controlling program 310, an AF control program 312 and a photographing program 314, etc., for example. The frame rate controlling program 310 is a program for controlling the frame rate of the image sensor 52, and executed in response to an operation of the shutter key. The AF control program 312 is a program for adjusting the focus with the focus lens 50. The photographing program 314 is a program for storing the image captured by the image sensor 52 into the flash memory 32.

Although illustration is omitted, the program for operating the mobile phone apparatus 10 includes a program for notifying an incoming call state, a program for making communications with the outside, etc.

Succeedingly, the data memory area 304 is provided with an exposure evaluated value buffer 330, an AF evaluated value buffer 332, a frame rate flag 334, an AE flag 336 and an AGC flag 338. In the exposure evaluated value buffer 330, an exposure evaluated value output from the AE evaluation circuit 60 is stored. In the AF evaluated value buffer 332, an AF evaluated value output from the AF evaluating circuit 68 is stored.

The frame rate flag 334 is a flag for determining whether or not the frame rate is maximum, and is switched between ON and OFF on the basis of an output from the AE evaluation circuit 60. For example, the frame rate flag 334 is constituted of one 1 bit register. When the frame rate flag 334 is turned on (established), a data value "1" is set to the register. On the other hand, if the frame rate flag 334 is turned off (not established), a data value "0" is set to the register.

The AE flag 336 is a flag for determining whether or not the exposure evaluated value is smaller than the exposure target value, and is switched between ON and OFF on the basis of an output from the AE evaluation circuit 60. Furthermore, the AGC flag 338 is a flag for determining whether or not a gain level in the CDS/AGC/AD circuit 54 is maximum, and is switched between ON and OFF on the basis of an signal output from the gain controlling circuit 62 via the AE evaluation circuit 60.

Although illustration is omitted, in the data memory area 304, data of images and character strings to be displayed on the display 30 are stored, and counters and flags necessary for operating the mobile terminal 10 are also provided.

Figure 5:
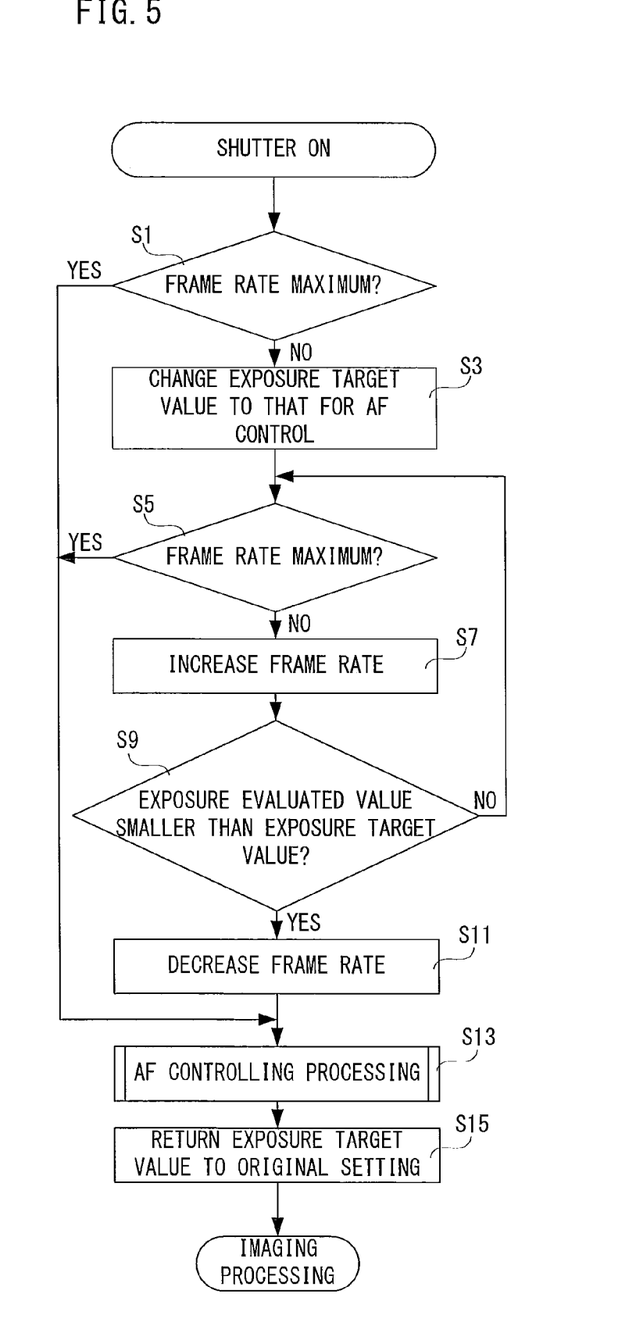
FIG. 5 is a flowchart showing one example of frame rate controlling processing of a first embodiment by a processor shown in FIG. 1.

The processor 24 executes in parallel a plurality of tasks including a frame rate controlling processing shown in FIG. 5 under the control of Linux (registered trademark)-based OSes such as Android (registered trademark), REX, etc. and other OSes.

FIG. 5 is a flowchart showing a frame rate controlling processing. For example, when the shutter key is operated by the user, the processor 24 determines whether or not the frame rate is a maximum value in a step S1. That is, it is determined whether or not the frame rate flag 334 is turned on. If "YES" in the step S1, that is, if the frame rate is the maximum value, the frame rate cannot be increased any more, and thus, the AF controlling processing is executed in a step S13 without executing the processing in the steps S3 to S11.

On the other hand, if "NO" in the step S1, that is, if the frame rate is not the maximum value, the exposure target value is changed to that for the AF control in the step S3. That is, the processor 24 applies an AE controlling processing executing instruction to the AE evaluating circuit 60 based on the exposure target value for AF control stored in the second register 60b. Then, in the AE evaluation circuit 60, a source from which a exposure target value is to be read is changed from the first register 60a to the second register 60b. Here, the processor 24 executing the processing in the step S3 functions as a changer.

Succeedingly, in the step S5, similar to the step S1, it is determined whether or not the frame rate is the maximum value. If "NO" in the step S5, that is, if the frame rate is not the maximum value, the frame rate is increased in the step S7. For example, the frame rate is increased such that the exposure evaluated value takes an intermediate value between the current exposure evaluated value and the target value. More specifically, the processor 24 applies an instruction of shortening the exposure time to the AE evaluation circuit 60, and the AE evaluation circuit 60 controls the exposure time controlling circuit 64 to thereby increase the frame rate. It should be noted that in another embodiment, the frame rate may be increased such that the exposure evaluated value may be equal to the target value for AF control. Here, the processor 24 executing the processing in the step S7 functions as an increase controller.

Succeedingly, in the step S9, it is determined whether or not the exposure evaluated value is smaller than the exposure target value. That is, when the frame rate is increased, the exposure evaluated value is made low. Thus, it is determined that the current exposure evaluated value is smaller than the exposure target value. Specifically, the processor 24 determines whether or not the AE flag 336 is turned on. If "NO" in the step S9, that is, if the exposure evaluated value is not smaller than the exposure target value, the process returns to the step S5 in order to further increase the frame rate. Furthermore, as a result of increase of the frame rate, if "YES" in the step S5, that is, if the frame rate becomes the maximum value, the process proceeds to the step S13.

If "YES" in the step S9, that is, if the exposure evaluated value is smaller than the exposure target value, the frame rate is decreased in the step S11. That is, the frame rate is decreased by one level such that the exposure evaluated value is larger than the exposure target value. More specifically, the processor 24 applies an exposure time prolongation correcting instruction to the AE evaluation circuit 60. The AE evaluation circuit 60 which receives the instruction controls the exposure time controlling circuit 64 to thereby decrease the frame rate by one level. Here, the processor 24 executing the processing in the step S11 functions as a decrease controller.

Succeedingly, in the step S13, the AF controlling processing is executed. That is, the processor 24 searches a peak of the AF evaluated values and moves the focus lens 50 at the lens position where the AF evaluated value becomes the maximum. Succeedingly, in a step S15, the exposure target value is returned to the original setting. That is, the processor 24 applies an AE controlling processing executing instruction based on the exposure target value for normal photographing stored in the first register 60a to the AE evaluating circuit 60. Then, in the AE evaluation circuit 60, a source from which the exposure target value is read out is returned to the first register 60a. After the completion of the processing in the step S15, the processor 24 ends the frame rate controlling processing and then executes photographing processing. Here, the processor 24 executing the processing in the step S15 functions as an initializer.

Thus, in the first embodiment, by utilizing the optimized exposure target value for the AF control, the frame rate can be increased. This makes it possible to make the processing time of the AF controlling processing shorter than that of the conventional AF controlling processing.

Second Embodiment

In the second embodiment, when the frame rate is decreased, if the exposure evaluated value is smaller than the exposure target value, the gain of the CDS/AGC/AD circuit 54 is heightened to thereby make the exposure evaluated value larger than the exposure target value. Thus, even if the exposure evaluated value is smaller than the exposure target value before the frame rate becomes the maximum value, the gain is heightened to thereby increase the exposure evaluated value, resulting in further increase of the frame rate. Alternatively, if the gain is the maximum value at a time when the exposure evaluated value is smaller than the exposure target value, the frame rate is decreased. That is, in the second embodiment as well, similar to the first embodiment, the frame rate can be increased to the utmost limit to the extent that the exposure evaluated value is not smaller than the exposure target value.

Generally, in a case that the gain of the CDS/AGC/AD circuit 54 is heightened, the noise of the raw image signal is also amplified, and thus, in the main photographing processing, the limit of the gain control is often restricted. However, in the AF controlling processing, the image is not stored, and thus, the maximum value of the gain dedicated to the AF controlling processing can be defined.

Since the second embodiment is the same as the first embodiment in the electric configuration, etc., detailed description of the block diagram, the memory map, etc. will also be omitted.

Figure 6:
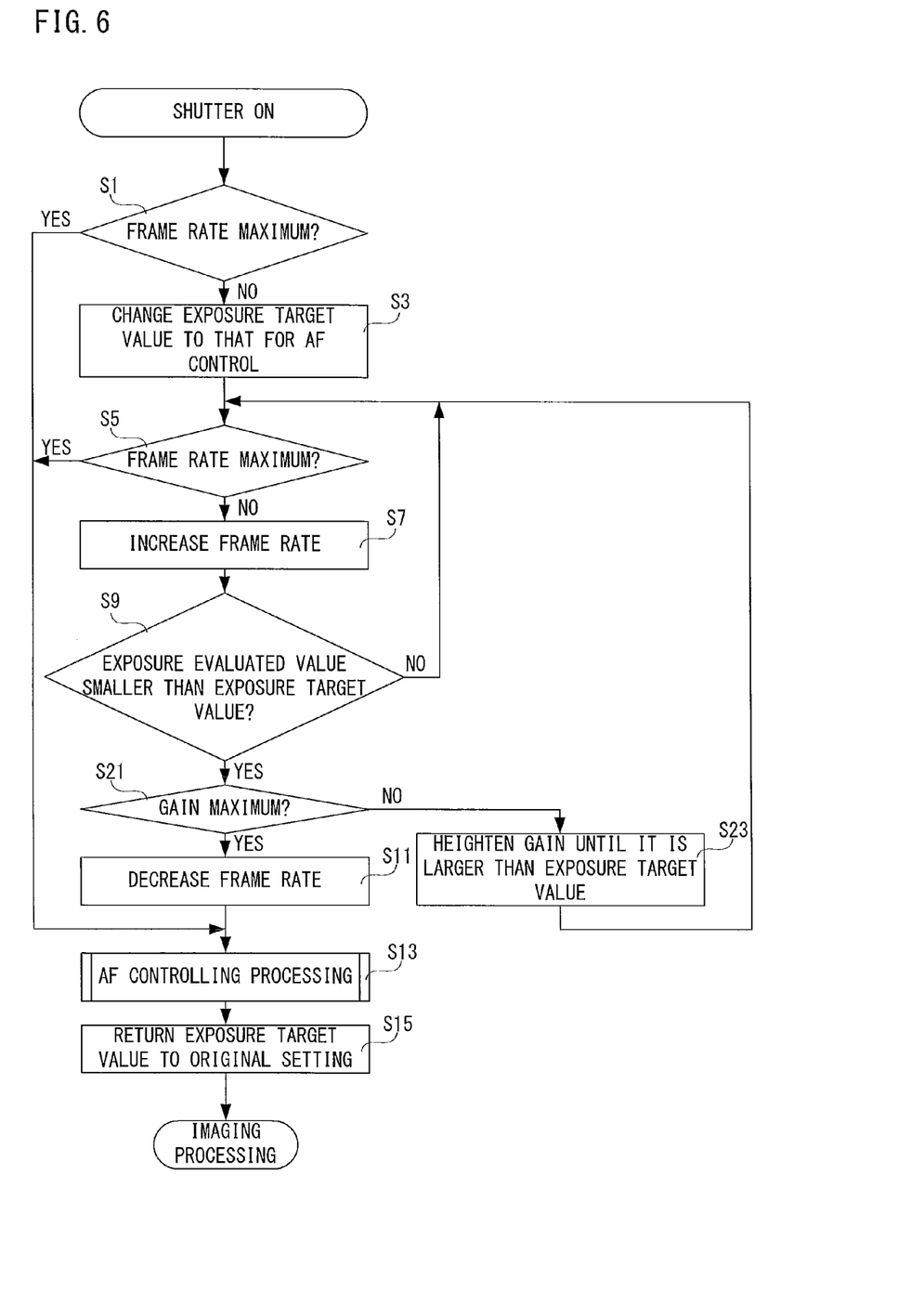
FIG. 6 is a flowchart showing one example of frame rate controlling processing of a second embodiment by the processor shown in FIG. 1.

FIG. 6 is a flowchart showing frame rate controlling processing of the second embodiment. Here, since the second embodiment is the same as the first embodiment except that processing in steps S21, S23 is added between the step S9 and the step S11, a redundant description is omitted.

The processor 24 determines whether or not the frame rate is the maximum value in the step S1. If "NO", the exposure target value is changed to that for AF control in the step S3. Succeedingly, in the step S5, it is determined whether or not the frame rate is the maximum value, and if "NO", the frame rate is increased in the step S7. Then, in the step S9, it is determined whether or not the exposure evaluated value is smaller than the exposure target value.

If "YES" in the step S9, that is, if the exposure evaluated value is smaller than the exposure target value for AF control, it is determined whether or not the gain is maximum in the step S21. That is, the gain of the CDS/AGC/AD circuit 54 is mad maximum by the gain controlling circuit 62, and it is determined whether or not the AGC flag 338 is turned on. If "NO" in the step S21, that is, if the gain of the CDS/AGC/AD circuit 54 can further be heightened, the gain is heightened to be larger than the exposure target value in the step S23, and the process returns to the step S5. That is, when the processing in the step S23 is executed, the AE evaluation circuit 60 heightens the gain of the CDS/AGC/AD circuit 54 until the exposure evaluated value is larger than the exposure target value for AF control. Here, the processor 24 executing the processing in the step S21 functions as a determiner, and the processor 24 executing the processing in the step S23 functions as a gain heightener.

Alternatively, if "YES" in the step S21, that is, if the gain of the CDS/AGC/AD circuit 54 is maximum, the frame rate is decreased in the step S11. Succeedingly, in the step S13, the AF controlling processing is executed, and in the step S15, the exposure target value is returned to the original setting.

Then, after completion of the processing in the step S15, the processor 24 ends the frame rate controlling processing, and then executes the photographing processing.

Thus, in the second embodiment, by merely controlling the exposure time and the gain correction, it is possible to speed up the AF controlling processing.

Here, even if the gain is heightened by the processing in the step S23, if the exposure evaluated value is not larger than the exposure target value, the process proceeds not to the step S5 but to the step S11 to thereby decrease the frame rate.

As understood from the explanation, the mobile phone apparatus 10 is equipped with the camera module 36 including the image sensor 52, the AE evaluation circuit 60, etc. When the camera function utilizing the camera module 36 is executed, the AE evaluation circuit 60 adjusts exposure such that the exposure evaluated value is equal to the exposure target value. In addition, after completion of adjustment of the exposure, the AF controlling processing is executed on the basis of the image data every frame. For example, when the shutter key included in the key input device 26 is operated, the exposure target value for normal photographing is changed to the exposure target value for AF control being smaller than the exposure target value for normal photographing. Furthermore, in response to the change of the exposure target value, the frame rate is increased such that the exposure evaluated value correlated to the frame rate is smaller than the exposure target value. Then, on the basis of the image data every frame output at the increased frame rate, the AF controlling processing is executed.

Accordingly, the time related to the AF controlling processing is shortened, capable of improving usability in photographing.

Specifically, in the low-light environment, an exposure targeted for optimum image quality in photographing and an exposure during a AF control are separately performed, whereby, a controlling time for the AF controlling processing which makes up great proportion to the time from an operation of the shutter key to the end of the photographing is shortened, capable of improving the usability of the user.

Furthermore, in a case that the LED 40 is made to emit light as a flash during a AF control, a processing time for AF controlling processing is shortened, which shortens a light-emission time of the LED 40 to thereby reduce electric power consumption and extend the life of the LED 40.

Additionally, in another embodiment, the number of registers included in the AE evaluation circuit 60 may be only one. In this case, the processor 24 sets the exposure target value for normal photographing or the exposure target value for AF control to the one register depending on the processing to be executed.

In a still another embodiment, for search of a peak in the AF controlling processing, a full search may be adopted without being restricted to the hill-climbing search.

Furthermore, the communication system of the mobile phone apparatus 10 is the CDMA system, but an LTE (Long Term Evolution) system, a W-CDMA system, a GSM system, a TDMA system, an FDMA system and a PHS system may be adopted.

Moreover, the frame rate controlling program 310 used in the present embodiment may be stored in an HDD of a server for data delivery, and delivered to the mobile phone apparatus 10 via a network. Also, the frame rate controlling program 310 is stored in a recording medium like an optical disk, such as CD, DVD, BD (Blu-ray Disc), etc., a USB memory, a memory card, or the like, and the recording medium with it stored may be sold or distributed. Then, in a case that the frame rate controlling program 310 downloaded from the aforementioned server and recording medium is installed onto a mobile phone apparatus having a similar configuration to the present embodiment, an advantage similar to the present embodiment can be obtained.

In addition, the present embodiment may be applied to smart phones and PDAs (Personal Digital Assistant) without being restricted to only mobile phone apparatuses 10.

It should be noted that all the concrete numerical values of the number of pixels, fps, the number of lens positions and the processing time that are depicted in the specification are simple examples, and are changeable as necessary depending on the specification of the product.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera device having an image sensor for outputting image data and an outputter for adjusting exposure of the image data output from said image sensor and outputting an evaluated value for exposure at that time, said camera device controlling a frame rate of the image data output by the image sensor and performing an auto focusing (AF) controlling processing based on the image data for every frame output from said image sensor, said camera device comprising:
a changer which changes from a first target value for normal photographing to a second target value for AF control being smaller than said first target value when a photographing operation is made;
an increase controller which continuously increases the frame rate while the evaluated value output by said outputter is being equal to or more than said second target value in response to the change made by said changer,
wherein the AF controlling processing is performed on the basis of the image data output at the frame rate increased by said increase controller; and
a decrease controller which decreases the frame rate by one when in accordance with the increase of the frame rate by said increase controller, the evaluated value output by said outputter is smaller than said second target value.

2. A camera device according to claim 1, further comprising:
a gain controller which controls a gain of an output from said image sensor;
a determiner which determines whether or not the gain of the output from said image sensor is maximum when in accordance with the increase of the frame rate by said increase controller, the evaluated value output by said outputter is smaller than said second target value; and
a gain heightener which heightens the gain of the output from said image sensor when said determiner determines that the gain of the output from said image sensor is not maximum.

3. A camera device according to claim 2, further comprising a decrease controller which decreases the frame rate by one when said determiner determines that the gain of the output from said image sensor is maximum.

4. A camera device according to claim 1, further comprising an initializer which returns said second target value to said first target value after said AF controlling processing is executed.

5. A mobile terminal comprising a camera device according to claim 1.

6. A camera device according to claim 1, wherein in response to the increase in the frame rate by the increase controller, the image data output by said image sensor becomes darker.

7. A camera device according to claim 6, wherein when the AF controlling process is completed, the image data output by said image sensor becomes lighter.

8. A frame rate controlling method of a camera device having an image sensor for outputting image data and an outputter for adjusting an exposure of the image data output from said image sensor and outputting an evaluated value for this exposure, said camera device controlling a frame rate of the image data output from the image sensor and performing an auto focusing (AF) controlling processing based on the image data for every frame output from said image sensor, said method comprising:
changing from a first target value for normal photographing to a second target value for AF control being smaller than said first target value when a photographing operation is made,
continuing to increase the frame rate while the evaluated value output by said outputter is being equal to or more than said second target value in response to the change made by said changer,
wherein the AF controlling processing is performed on the basis of the image data output at the frame rate increased by said increase controller, and
decreasing the frame rate by one when, in accordance with the increase of the frame rate, the evaluated value output by said outputter is smaller than said second target value.

9. A method according to claim 8, wherein increasing the frame rate further comprises darkening the image data output by said image sensor.

10. A method according to claim 9, further comprising lightening the image data output by said image sensor in response to completion of the AF controlling process.

* * * * *